United States Patent [19]
Lei

[11] Patent Number: 6,130,911
[45] Date of Patent: Oct. 10, 2000

[54] METHOD AND APPARATUS FOR COMPRESSING REFERENCE FRAMES IN AN INTERFRAME VIDEO CODEC

[75] Inventor: Shawmin Lei, Camas, Wash.

[73] Assignee: Sharp Laboratories of America, Inc., Camas, Wash.

[21] Appl. No.: 08/975,922

[22] Filed: Nov. 21, 1997

[51] Int. Cl.[7] .................................................. H04N 7/36
[52] U.S. Cl. ............................. 375/240.16; 375/240.18
[58] Field of Search .................................. 348/409, 413, 348/416; 375/240, 240.12, 240.16, 240.18; H04N 7/36

[56] References Cited

U.S. PATENT DOCUMENTS

| | | | |
|---|---|---|---|
| 5,436,666 | 7/1995 | Astle | 348/416 |
| 5,526,295 | 6/1996 | Astle | 382/232 |
| 5,539,664 | 7/1996 | Haghighi et al. | 348/396 |
| 5,585,852 | 12/1996 | Agarwal | 348/398 |
| 5,635,985 | 6/1997 | Boyce et al. | 348/402 |
| 5,777,677 | 7/1998 | Linzer | 348/398 |
| 5,825,419 | 10/1998 | Mishima | 348/416 |

FOREIGN PATENT DOCUMENTS

| | | |
|---|---|---|
| 0687111 | 12/1995 | European Pat. Off. . |
| 0778709 | 6/1997 | European Pat. Off. . |
| 0782345 | 7/1997 | European Pat. Off. . |
| 0794673 | 9/1997 | European Pat. Off. . |
| 0794675 | 9/1997 | European Pat. Off. . |
| 2310101 | 8/1997 | United Kingdom . |
| 97/36376 | 10/1997 | WIPO . |

OTHER PUBLICATIONS

Bao, J., et al. "HDTV Down–Conversion Decoder," *International Conference on Consumer Electronics*, pp. 100–101 (1996).

Hilton, M., et al. "Compressing Still and Moving Images with Wavelets," *Multimedia Systems*, Vo. 2, No. 3, pp. 218–227. (Dec. 1994).

LaGall, D., "MPEG: A Video Compression Standard for Multimedia Applications," *Communications of the ACM*, vol. 34, No. 4 pp. 47–58. (Apr. 1991).

Pearlstein, L., et al. "An SDTV Decoder with HDTV Capability: An All Format ATV Decoder," *137th SMPTE Proceedings*, pp. 422–434, (Sep. 6, 1995–Sep. 9, 1995).

Said, A., et al., "A New, Fast, and Efficient Image Codec Based on Set Partitioning in Hierarchical Trees," *IEEE Transactions on Circuits and Systems for Video Technology*, vol. 6, No. 3, pp. 243–250. (Jun. 1996).

Balasubramanian, R., et al., "Sequential scalar quantization of color images," Journal of Electronic Imaging, vol. 3, No. 1, pp. 45–59 (Jan. 1994).

International Search Report for PCT/IB98/01848 (Jan. 21, 1999).

*Primary Examiner*—Howard Britton
*Attorney, Agent, or Firm*—Morrison & Foerster LLP

[57] ABSTRACT

An reference image compressor for use in an encoding system or a decoding system. The reference image compressor includes compression circuitry and decompression circuitry. The compression circuitry compresses reference frame information. The decompression circuitry decompresses at least a portion of the reference frame information where the portion is selected in response to a motion vector.

25 Claims, 5 Drawing Sheets

METHOD AND APPARATUS FOR COMPRESSING REFERENCE FRAMES IN AN INTERFRAME VIDEO CODEC

BACKGROUND

1. Field of the Invention

The present invention relates to the transmission and storage of images, and, in particular, to interframe video encoding and decoding.

2. Description of the Related Art

Image processing generally employs two compression techniques: intraframe compression and interframe compression. Intraframe compression compresses the information within a single image, and includes techniques such as the discrete cosine transform. Interframe compression exploits the temporal redundancy between sequential image frames. Frequently, parts of an image in one frame are merely a translation in the x-y plane of the same image portion from a previous frame. Accordingly, the position of the translated portion can be communicated by transmitting the previous frame along with a motion vector specifying the translation of that portion. By not transmitting the entire second frame, such a system substantially reduces the number of bits that must be transmitted.

All the video coding standards, including H.261, MPEG-1, MPEG-2, H.263, and very likely the new MPEG-4 standard, employ motion predictive interframe coding to remove temporal redundancy. The MPEG standards employ three types of pictures: intrapictures (I), predicted pictures (P), and bidirectionally interpolated pictures (B). Intrapictures generally serve as reference frames with only moderate compression. Predicted pictures are coded with reference to a past picture, an intrapicture or another predicted picture, and are generally used as a reference for future predicted pictures. Bidirectional pictures provide the highest amount of compression, but require both a past and a future reference for prediction. Bidirectional pictures are usually not used as a reference.

Figure 1:
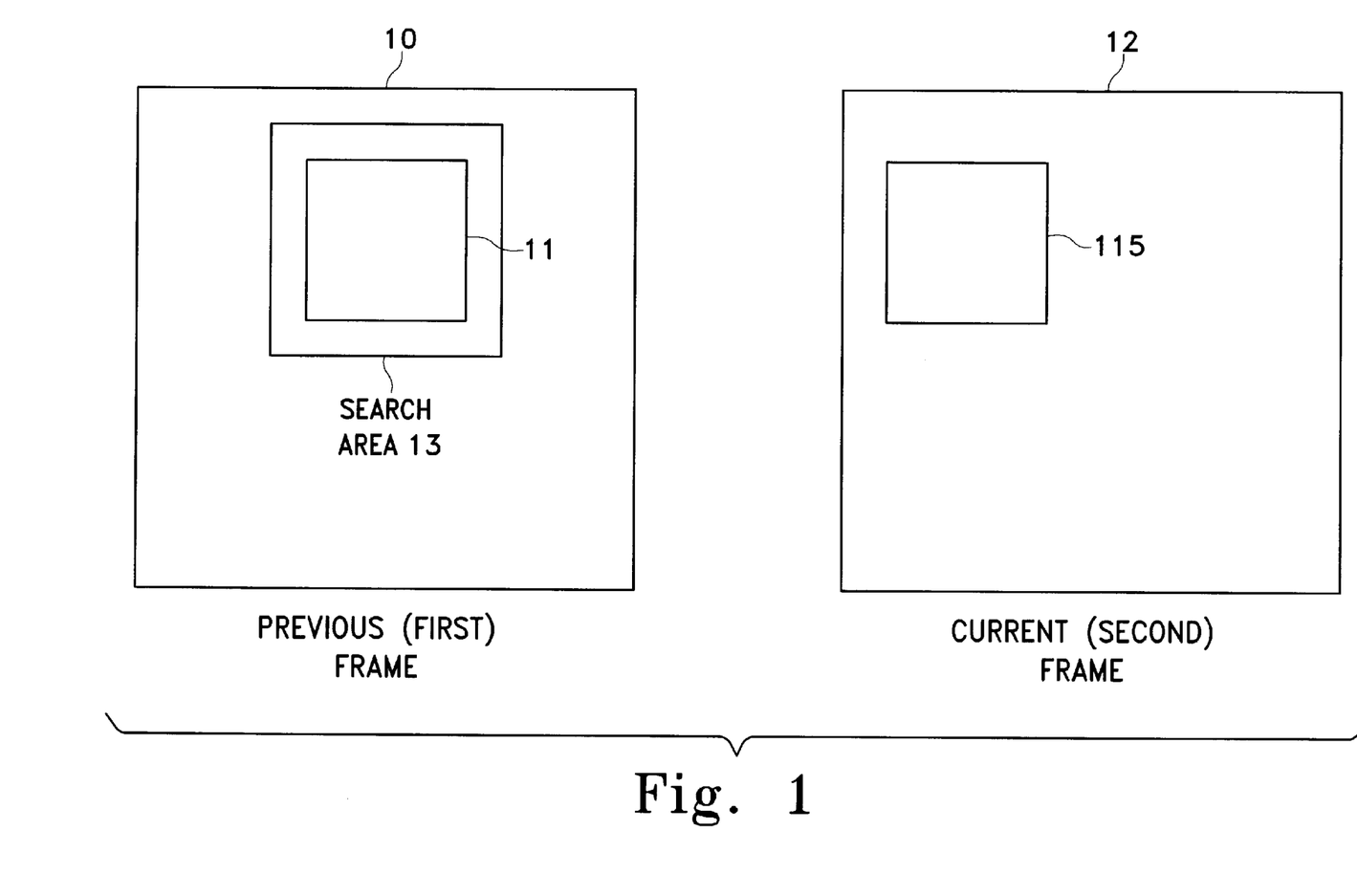
FIG. 1 is a diagrammatic representation of first and second image frames.
Figure 2:
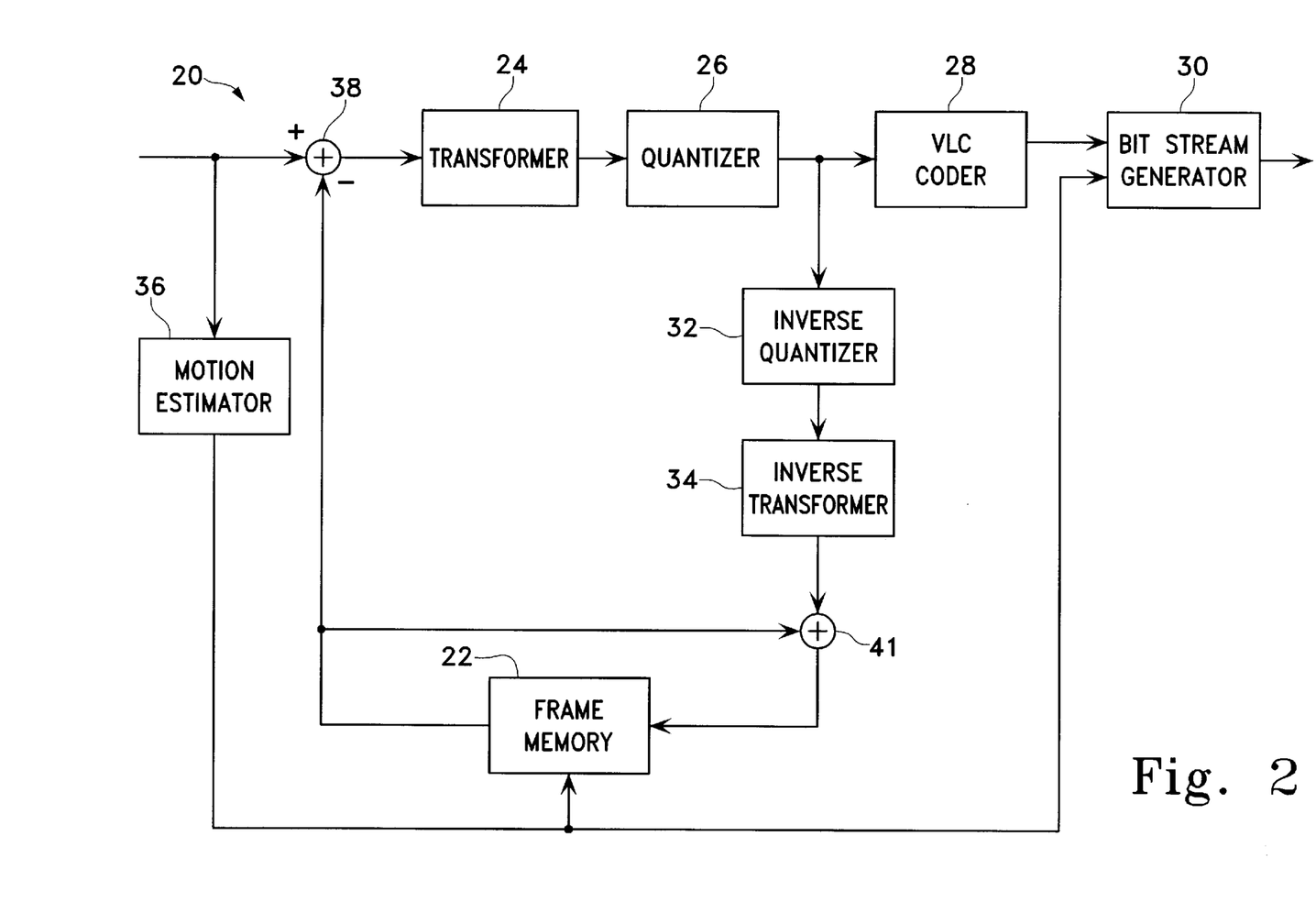
FIG. 2 is a diagrammatic representation of a conventional encoding system.

Motion compensation ("motion estimation") is explained with reference to FIGS. 1 and 2. FIG. 1 illustrates a current (second) frame 12 that is to be predicted using a previous (first) frame 10. The first image 10 may or may not immediately precede the second image 12. FIG. 2 illustrates a conventional encoding system 20.

The encoding system 20 receives the first and second video image frames 10 and 12, respectively, and generates motion vectors to encode the second image 12. The images are stored in an encoder frame memory 22. In a motion estimator 36, the video signals of the second frame 12 are compared to the video signals of the first frame 10 to determine the location of portions of the first frame 10 that correspond to portions of the second frame 12.

Because the motion vector informs a conventional decoding system 40 where to find a particular block within the first image 10, the first image 10 must be transmitted as a reference image to the conventional decoding system 40. Before transmission, the first image 10 is compressed by performing a number of functions on a block-by-block basis (I-frame coding).

The conventional encoding system 20 receives the first video image frame 10. A transformer 24 intraframe transforms the first video image 10. The transformer 24 uses standard transformation techniques, such as the discrete cosine transform (DCT). A quantizer 26 quantizes the output of the transformer 24. The output of the quantizer is variable length coded by a variable length coder 28. In turn, the output of the variable length coder 28 is input to a bit stream generator 30, which outputs an encoded bit stream.

The output of the quantizer 26 is also input into an inverse quantizer 32. The inverse quantizer output is inverse transformed by an inverse transformer 34. The output of the inverse transformer 34 is stored in the frame memory 22. All blocks of the image frame are sequentially stored in the frame memory 22.

When the second frame 12 is input to the conventional encoding system 20, a motion estimator 36 produces motion vectors determining blocks in the frame memory 22 which most closely match blocks in the second image frame 12. The motion estimator 36 compares the pixels of a selected block 11 to the pixels of a corresponding, but larger, search area 13 within the first frame 10 to determine the block of the first frame 10 that most closely matches the selected block 11 of the second frame 12. The match may be determined using standard pattern matching techniques. If a match is indicated, the location of the matched block ("the motion compensation block") within the search area relative to the location of the block selected from the second image 12 provides a motion vector indicating the displacement of the current block with respect to the previous block. Once they are calculated by the motion estimator 36, the motion vectors are sent to the bit stream generator 30, where they are converted into a bit stream and output from the encoding system 20.

Additionally, an adder 38 subtracts the motion compensation block, selected from frame memory 22 by the motion vector, from an actual image block in the second image frame 12. A resulting error block is input to the transformer 24. A transformed error block output by the transformer 24 is input to the quantizer 26. The quantizer 26 outputs a transformed and quantized motion error block to the variable length coder 28. Subsequently, the bit stream generator 30 produces a bit stream resulting from the variable length coder 28 acting on that input.

The transformed and quantized error block is also input to the inverse quantizer 32. An inverse transformer 34 applies to that output the inverse of the transform applied by the transformer 24. An adder 41 combines the error block with the motion compensation block selected from the frame memory to form a reconstructed P block resembling the original block in the second image frame 12 which was input to the conventional encoding system 20. This reconstructed P block is stored in the frame memory 22 for future image predictions.

The MPEG standard also supports bidirectionally predicted pictures. For example, assume that successive frames 1 2 3 4 are to be transmitted, where frame 1 is the I picture, frames 2 and 3 are B pictures, and frame 4 is a P picture. Frame 4 is predicted as described above by calculating one motion vector and error image per block with respect to frame 1. Frames 2 and 3 are bidirectionally predicted so that they incorporate information from both past (e.g., frame 1) and future frames (e.g., frame 4).

Two motion vectors and one error block are transmitted for each bidirectionally predicted block. The first motion vector for frame 2, in this example, is the motion vector computed with respect to I frame 1. The second motion vector is calculated with respect to P frame 4. The two motion vectors are used to generate two predicted motion compensation blocks for B frame 2. The two predicted blocks calculated with respect to frames 1 and 4 are averaged together to generate an average predicted block. The difference between the average predicted block and the corresponding actual block from B frame 2 represents the error block for B frame 2.

B frame 3 is compressed in a similar manner by calculating two motion vectors with respect to I frame 1 and P frame 4, averaging the two predicted blocks and computing an error image with respect to the I and P frames. The information derived from these four frames is transmitted by the conventional encoding system 20 in the following order: I frame 1, P frame 4, B frame 2, B frame 3, or more specifically on a block basis: I frame 1, P frame 4 motion vector and error block, B frame 2 motion vectors and error block, B frame 3 motion vectors and error block. Note that if the B frames are predicted from two P frames (i.e. $P_1B_2B_3P_4$), the frame information would be transmitted as follows: $P_1P_4B_2B_3$. Further, those skilled in the art will recognize that there are many ways of encoding the B frames, including: intracoded with no motion vectors, forward predicted and backward predicted (the latter two requiring only one motion vector).

Figure 3:
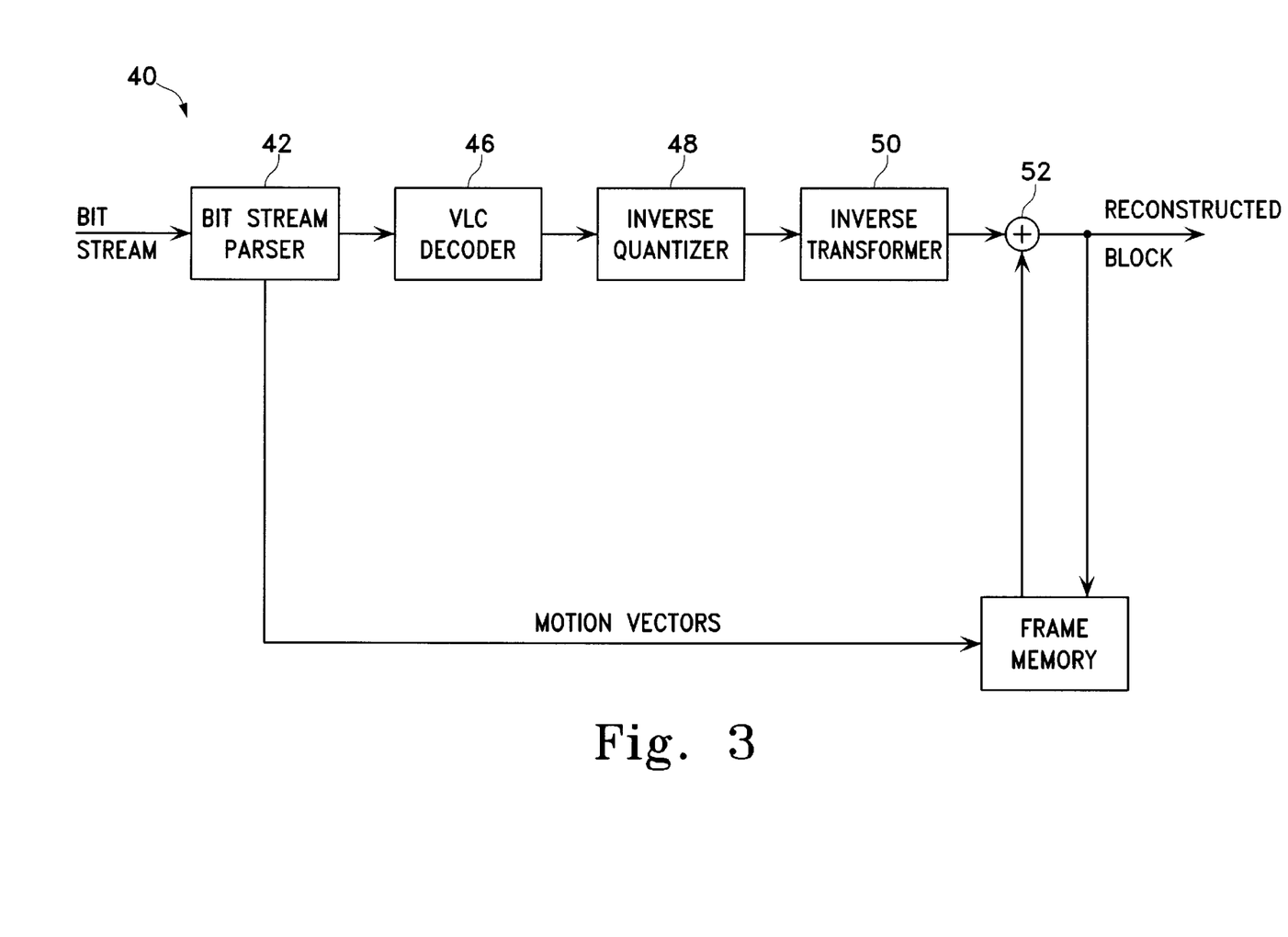
FIG. 3 is a diagrammatic representation of a conventional decoding system.

Referring to FIG. 3, a conventional decoding system 40 receives a bit stream in the format output by the encoding system 20. This bit stream is parsed by a bit stream parser 42. When a formatted or coded first frame 10 is received by the conventional decoding system 40, its coded blocks are sent to a variable length coding (VLC) decoder 46. Each block of the first image 10 is decoded by the VLC decoder 46 and output to an inverse quantizer 48. Subsequently, an inverse transformer 50 performs inverse transformations on an output of the inverse quantizer 48. The inverse transformer 50 performs an inverse transform to invert the transformation performed by the transformer 24. The inverse transformer produces a reconstructed first frame block. The reconstructed block is output from the conventional decoding system 40 and also stored in a frame memory 44.

After all of the bits in the bit stream corresponding to the first image frame blocks are decoded by the conventional decoding system 40, the conventional decoding system 40 receives bits corresponding to the motion vector and error block for the second image frame 12. If the bit stream parser 42 determines that information in the bit stream corresponds to a motion vector, the motion vector or motion vector information is sent to the frame memory 44. The motion vector determines what block in frame memory 44 is required to predict a block in the second image frame 12.

When the bit stream parser 42 parses an error block for the second image frame 12, that information is sent to the VLC decoder 46, followed by the inverse quantizer 48 and the inverse transformer 50. An adder 52 combines the resulting decoded error block with the block selected by the motion vector and retrieved from the frame memory 44. The adder 52 thus produces a reconstructed block for the second image frame 12. The reconstructed block is then outputted by the conventional decoding system 40 and stored in the frame memory 44 for future decoding.

In order to calculate the B frames, the P frame must also be stored in frame memory 44, as above. The first motion vector for a B frame selects, in this example, a predicted block from the stored I or P frame. The second motion vector selects a predicted block from the stored P or I frame. These two predicted blocks are added together and divided by 2 to calculate an average bidirectionally predicted block. Those skilled in the art will recognize that a bidirectionally predicted block may also be interpolated from two successive P frames. The bidirectionally interpolated block is then added to the error block for the B frame to generate a reconstructed block for the B frame. This process is continued for all the blocks in the B frame.

The above-described techniques require storage of a full frame in frame memory to compute each P frame, and two frames to compute each B frame. The cost of memory predominates in the cost of conventional MPEG-2 decoders. Pearlstein et al. and Bao et al. have considered a low-cost HDTV down-conversion decoder that decodes the HDTV bitstream and converts it to a standard-definition television bitrate. See L. Pearlstein et al. "An SDTV Decoder with HDTV Capability: An All Format ATV Decoder", 137th SMPTE Proceedings, Sep. 6–9, 1995, PP. 422–434, and J. Bao et al. "HDTV Down-Conversion Decoder", *International Conference on Consumer Electronics,* 1996. The common theme of these approaches is downsampling the reference frame for storage and upsampling the frames when they must be used in calculations. This approach leads to a serious drawback called prediction drift. Because downsampling discards much information, the motion prediction loop in the conventional decoding system 40 cannot keep track of the motion prediction loop in the conventional encoding system 20. The error accumulates, and the picture blurs as the predicted frames are further away from the intra-coded frame. This leads to a pulsing artifact as the picture deteriorates between two intra-coded frames and then suddenly becomes clear again when the next intra-coded frame is reached.

Alternative proposals suggest the use of a "sprite." A sprite is a large reference image that is often the background of a scene. It can be static or dynamic. Alternatively, Long-Term Frame Memory (LTFM) employs an extra frame memory to store a frame (perhaps the first frame) after a scene change. This frame is used as an extra reference frame for motion compensation. Both methods have been reported to result in significant coding efficiency improvement. However, the significant increase in cost from extra memory may be a critical obstacle for these techniques to be practical.

Accordingly, it is desired to provide an interframe coding technique that minimizes the use of frame memory while at the same time maintaining high picture quality.

SUMMARY OF THE INVENTION

The invention relates to an apparatus and method for compressing a reference image in an interframe image codec. The interframe image codec includes a reference image compressor having compression circuitry and decompression circuitry. The compression circuitry compresses reference frame information. The decompression circuitry decompresses at least a portion of the compressed reference frame information, where the portion is selected in response to a motion vector.

In some embodiments, the compression circuitry compresses the reference frame information into a fixed-length code such as the embedded wavelet coding. The reference frame information is compressed on a block-by-block basis.

The reference image compressor includes compressed frame memory for storing the compressed reference frame information. The reference frame image compressor also includes block memory for storing a decompressed motion compensation block of the reference information where the motion compensation block is specified by the motion vector. The block memory may also store decompressed blocks of the reference information adjacent to the motion compensation block.

The present invention has smaller memory requirements than codecs. The invention compresses image frame blocks before storage in a memory instead of storing uncompressed blocks.

DETAILED DESCRIPTION OF THE INVENTION

The present invention provides a method and apparatus for compressing reference frames in any interframe image coding and decoding system (codec). Video information is considered to be a particular type of image information. In the following description, numerous details are set forth in order to enable a thorough understanding of the present invention. However, it will be understood by those of ordinary skill in the art that these specific details are not required in order to practice the invention. Further, well-known elements, devices, process steps and the like are not set forth in detail in order to avoid obscuring the present invention An interframe reference compressor 100 or 200 of the present invention may be used to compress images processed by an encoding system 60 of FIG. 4 and a decoding system 180 of FIG. 5. Both the encoding system 60 and the decoding system 180 may be implemented in hardware, software, firmware, or any combination thereof according to standard techniques.

Figure 4:
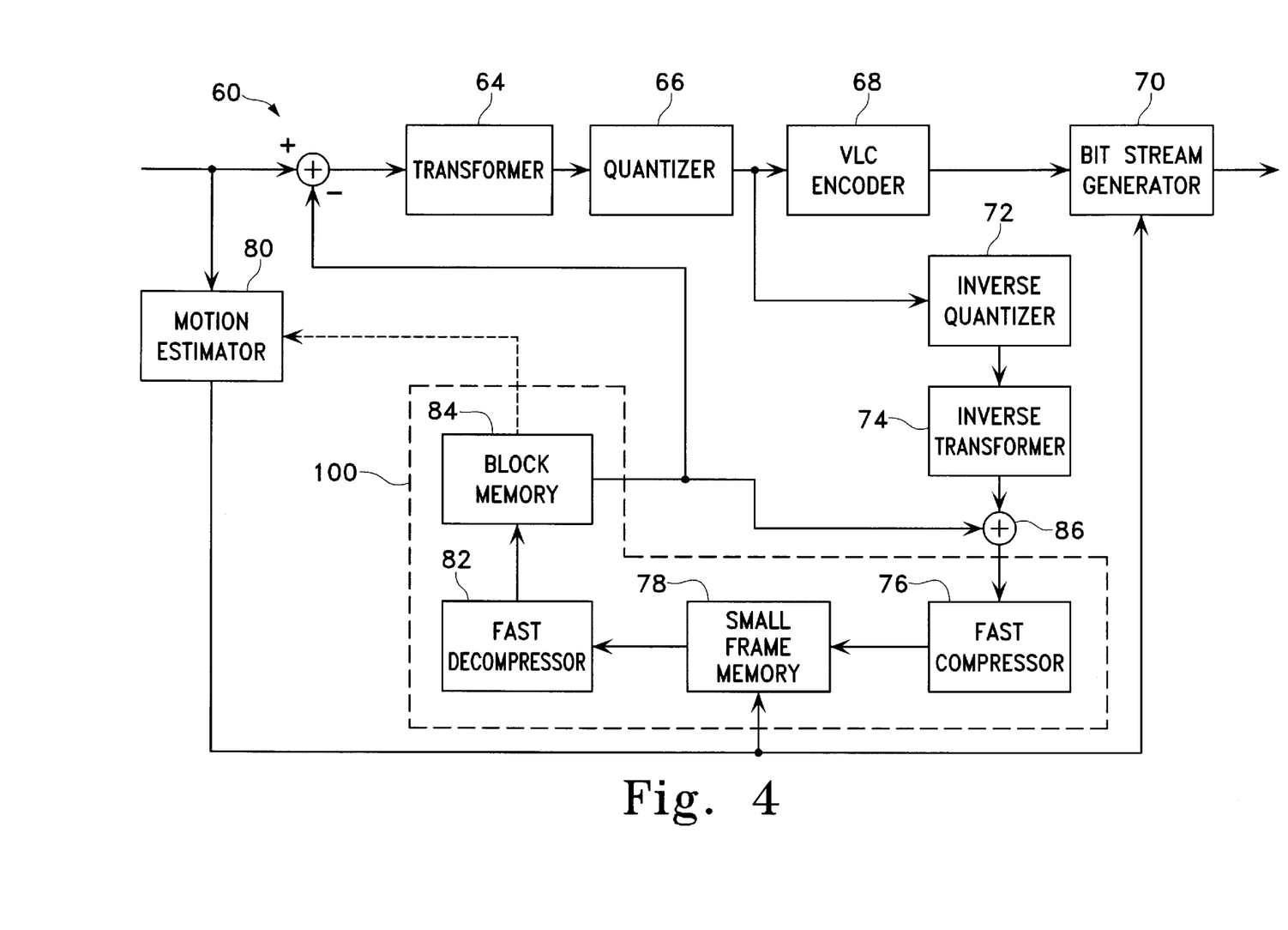
FIG. 4 is a diagrammatic representation of a encoding system of the present invention.

The encoding system 60 receives a first image frame 10. A transformer 64 receives each block of the first image frame 10 as input. The transformer 64 utilizes any of various transformation schemes, such as discrete cosine transforms, fast Fourier transforms, discrete Fourier transforms, etc. By transforming the pixel data, the transformer 64 decorrelates pixel data for the block. The output of the transformer 64 is input to a quantizer 66. The output of the quantizer is acted upon by a VLC encoder 68. An encoded block output by the encoder 68 is turned into a bit stream by a bit stream generator 70 and output by the encoding system 60.

Those skilled in the art will recognize that the present invention is not limited to decoding images provided by the VLC encoder 68 of FIG. 4. For example, the variable length encoder 68 may be replaced by a fixed length encoder in which transforms such as the wavelet transform are employed. Further information regarding image encoding may be found in U.S. Pat. Nos. 5,436,666, issued to Astle; 5,539,664, issued to Haghighi et al.; 5,526,295, issued to Astle; D. LeGall, "MPEG: A Video Compression Standard for Multimedia Applications," *Communications of the ACM*, Vol. 34, No. 4, April 1991, pp. 47–58; and M. Hilton, B. Jawerth, A. Sengupta, "Compressing Still and Moving Images with Wavelets," *Multimedia Systems*, Vol. 2, No. 3, December 1994, pp. 218–227, all of which are incorporated by reference herein.

In addition to outputting its quantized output to the VLC encoder 68, the quantizer 66 inputs data into an inverse quantizer 72. An inverse transformer 74 acts on the output of the inverse quantizer 72 to reverse the effects of the transformer 64. The application of the inverse quantizer 72 and the inverse transformer 74 essentially mimics the effects of an inverse quantizer 186 and an inverse transformer 188 in the decoding system 180 to be discussed below with respect to FIG. 5. A resulting output from the inverse transformer 74 is compressed by a fast compressor 76. A small frame memory 78 stores an output of the fast compressor 76. The fast compressor 76 permits the storage of a much smaller amount of data than was required by the frame memory 22 of the conventional encoding system 20 in FIG. 2. The compression techniques employed by the fast compressor 76 will be discussed in more detail below.

All of the blocks in the first image frame 10 are processed in this fashion by the encoding system 60. All the blocks are encoded into bit streams and output by the bit stream generator 70. All blocks are also compressed and stored in the small frame memory 78.

After all the blocks of the first image have been processed by the encoding system 60, the second image frame 12 is input to the encoding system 60. A motion estimator 80 generates motion vectors estimating which blocks of the previous first image frame 10 correlate highly with blocks in the second image frame 12. Each motion vector is a function of a block in the second image frame 12 and one or more blocks in the first image frame 10. For each block in the second image frame 12, there is a corresponding predetermined search area within the first image frame 10. Note that the first image frame 10 can be either an original frame or a reconstructed frame. If the original is used, a frame memory is needed in the motion estimator 80. In this case, the motion estimator 80 performs similarly to the motion estimator 36 in the conventional encoding system 20.

If the reconstructed frame is used, the motion estimator 80 retrieves one or more blocks overlapping the search area 13 from the block memory 84. The retrieved blocks are compared with the block in the second image frame 12 to determine the motion vector. The number of blocks retrieved depends on the size of the search area 13 and the size of the blocks. Enough blocks are retrieved to cover the search area 13.

Initially, the search area for the first block in the second image frame 12 is decompressed by a decompressor 82 and stored in a block memory 84. When the first block of the second image 12 is received by the encoding system 60, the motion estimator 80 retrieves the search area from the block memory 84 and calculates a motion vector for the first block. The motion vector for the first block is output to the bit stream generator 70, which in turn outputs a bit stream representation of the motion vector.

Subsequently, a second block for the second image frame 12 is input to the motion estimator 80. As with the first block in the second image frame 12, blocks in the first image 10 stored in the small frame memory 78 are decompressed by the decompressor 82 and stored in the block memory 84 in order to form the second search area. Some of the blocks required for the second search area may already have been stored in the block memory 84 as part of the first search area, and thus need not be retrieved and decompressed again. Once all of the search area blocks are stored in the block memory 84, the motion estimator 80 retrieves the predetermined search area 13 from the block memory 84 and calculates a motion vector for the second block. The motion vector for the second block is output to the bit stream generator 70, which in turn outputs a bit stream representation of the second motion vector. As with the first block and motion vector, the second motion vector selects a nearby motion compensation block from the search area blocks in the block memory 84. This procedure continues for each block in the second image frame 12 input to the encoding system 60.

In FIG. 4 an adder 83 also acts on each block of the second image frame 12 that is input to the encoding system 60. The adder 83 subtracts the motion compensation block (retrieved from block memory 84) from the actual block in the second image frame 12 corresponding to the motion vector. A resulting error block is then input into a transformer 64. The quantizer 66, the VLC encoder 68, and the bit stream generator 70 act upon the error block to produce a bit stream for the error block just as a bit stream was generated for each block in the first image frame 10.

Likewise, the output of the quantizer 66 acting upon the error block is fed through the inverse quantizer 72 and inverse transformer 74 to reconstruct the error block. An adder 86 combines the reconstructed error block with the motion compensation block selected from block memory 84 to form a reconstructed block of the second image frame 12. The reconstructed block is compressed by the fast compressor 76 and stored in the small frame memory 78. The reconstructed block stored in the small frame memory 78 may be used as the reference block for future predictions of blocks in future images.

Additional predictions can be made for future images by essentially using predicted (second frame) blocks stored in the small frame memory 78 as if they were part of the first (I) frame image 10. In this fashion, subsequent frames would have additional motions vectors produced by the motion estimator 80. Processing would continue as before.

The reference image compressor 100 in FIG. 4 will now be described in more detail. The discussion will focus on data structures and the compression techniques employed by the fast compressor 76.

There must be some way to correlate the compressed data stored in the small frame memory 78 with individual uncompressed blocks. This influences the data representation and compression techniques used in the encoding system 60. Two appropriate storage schemes are variable length coding and fixed length coding.

Using variable length coding, the length of each code word depends upon the information contained in a block. In order to extract the code for a particular block, the system maintains a pointer indicating the start of each block. In one embodiment to locate an nth block in a frame, the pointer determines the total memory length in bytes occupied by the (n−1) previous blocks for the frame to find the starting point of the nth compressed block.

As an alternative to using variable length coding, the present invention may use a fixed-length code for each reference block. One such code is the wavelet code described below. For example, a 16×16 block of 8-bit pixels represents 256 bytes of information. Using 4:1 compression, this data reduces to 64 bytes for each block. To locate the nth block in a frame, the system need only find byte number 64n as the starting point of the nth compressed block in the small frame memory 78.

The fast compressor 76 in FIG. 4 preferably implements wavelet encoding. The compression algorithm first applies the wavelet transform to the incoming reference block. The compressor then performs embedded coding of the resulting wavelet coefficients. The compressed block sizes may be chosen to be 16×16 in the luminance (Y) domain. In one example, we may assume that the chroma subsampling is 4:2:0, so that the corresponding chrominance U and V blocks are 8×8 each.

Because of the relatively small size of the compressed block, the basis for the wavelet transform must be short. Accordingly, in one embodiment the present invention employs the Haar basis: $(1/\sqrt{2}, 1/\sqrt{2})$ and $(1/\sqrt{2}, -1/\sqrt{2})$. Four layers of the wavelet transform may be applied to the luminance block and three layers to the corresponding chroma blocks, as an example.

One layer of the wavelet transform may be represented by the following equations:

$$LL: C(i,j)=[X(2i,2j)+X(2i+1,2j)+X(2i,2j+1)+X(2i+1,2j+1)]/2$$

$$LH: C(N/2+i,j)=[X(2i,2j)-X(2i+1,2j)+X(2i,2j+1)-X(2i+1,2j+1)]/2$$

$$HL: C(i,N/2+j)=[X(2i,2j)+X(2i+1,2j)-X(2i,2j+1)-X(2i+1,2j+1)]/2$$

$$HH: C(N/2+i,N2+j)=[X(2i,2j)-X(2i+1,2j)-X(2i,2j+1)+X(2i+1,2j+1)]/2$$

Where $i,j=0, 1, \ldots, N/2$, C are the transform coefficients and X are the two-dimensional pixel intensities. Multiple layers of the wavelet transform are formed by successive transforms of the LL band.

The fast compressor 76 then performs embedded coding of the wavelet coefficients. Embedded coding of transform coefficients is well known in the art. Embedded coding hierarchically encodes the wavelet coefficients based on the importance of the information content of the coefficients. Under this scheme, the most significant bits (MSB) of these coefficients are transmitted first, followed by the next MSBs, and so on until the least significant bits are transmitted. With such a progressively transmitted, embedded bitstream, the reception of code bits can be stopped at any point, and the entire image can be decompressed and reconstructed while maintaining good quality. The earlier the received bitstream is truncated, the compression has a higher ratio and lower quality. Because the most important information, which yields the largest distortion reduction, is transmitted first, embedded coding yields the minimum distortion due to truncation.

One embedded coding scheme that may be employed by the present invention is described in A. Said, W. Pearlman, "A New, Fast, and Efficient Image Codec Based on Set Partitioning in Hierarchical Trees," *IEEE Transactions on Circuits and Systems for Video Technology*, Vol. 6, No. 3, June 1996, pp. 243–250, which is incorporated by reference herein.

The Said-Pearlman algorithm was designed to compress a one wavelet-transformed image, e.g. a monochromatic grayscale image, the luminance (e.g., Y) image, or one of two chrominance images (e.g., Cr or Cb). In order to increase the efficiency of color encoding, the compressor of the present invention encodes the luminance (e.g., Y) block and two chrominance blocks together to share the memory and modifies the Said-Pearlman algorithm accordingly. The modification initializes the Said-Pearlman algorithm by including 12 nodes in the highest pyramid level of 3 wavelet transforms (4 nodes from each wavelet transform) into a List of Insignificant Pixels (LIP) and 9 type-A trees (3 from each wavelet transforms) into a List of Insignificant Sets (LIS). The present invention also can weight coefficients of different channels (Y, Cr, and Cb) to take into consideration that a human eye has different sensitivities to Y, Cr, and Cb. For example, the human eye is usually more sensitive to Y, less sensitive to Cr, and even less sensitive to Cb. Therefore, to take this into consideration, the present invention can weight the Y, Cr, and Cb coefficients by 1:0.5:0.25 or 1:0.5:0.5 before feeding them to the modified Said-Pearlman algorithm and reverse the weighting (1:2:4 or 1:2:2) after decoding of the modified Said-Pearlman algorithm in the fast decompressor 82.

The size requirements of the small memory 78 and the block memory 84 vary between particular embodiments. In particular, the size of the small frame memory 78 depends on the compression ratio. For example, if the compression ratio is 6:1, then the small frame memory is 1/6 the size of the frame memory 22 in the conventional encoding system 20. In a typical application, the block memory would be between 384 and 4×384 words, although other sizes can be used.

Figure 5:
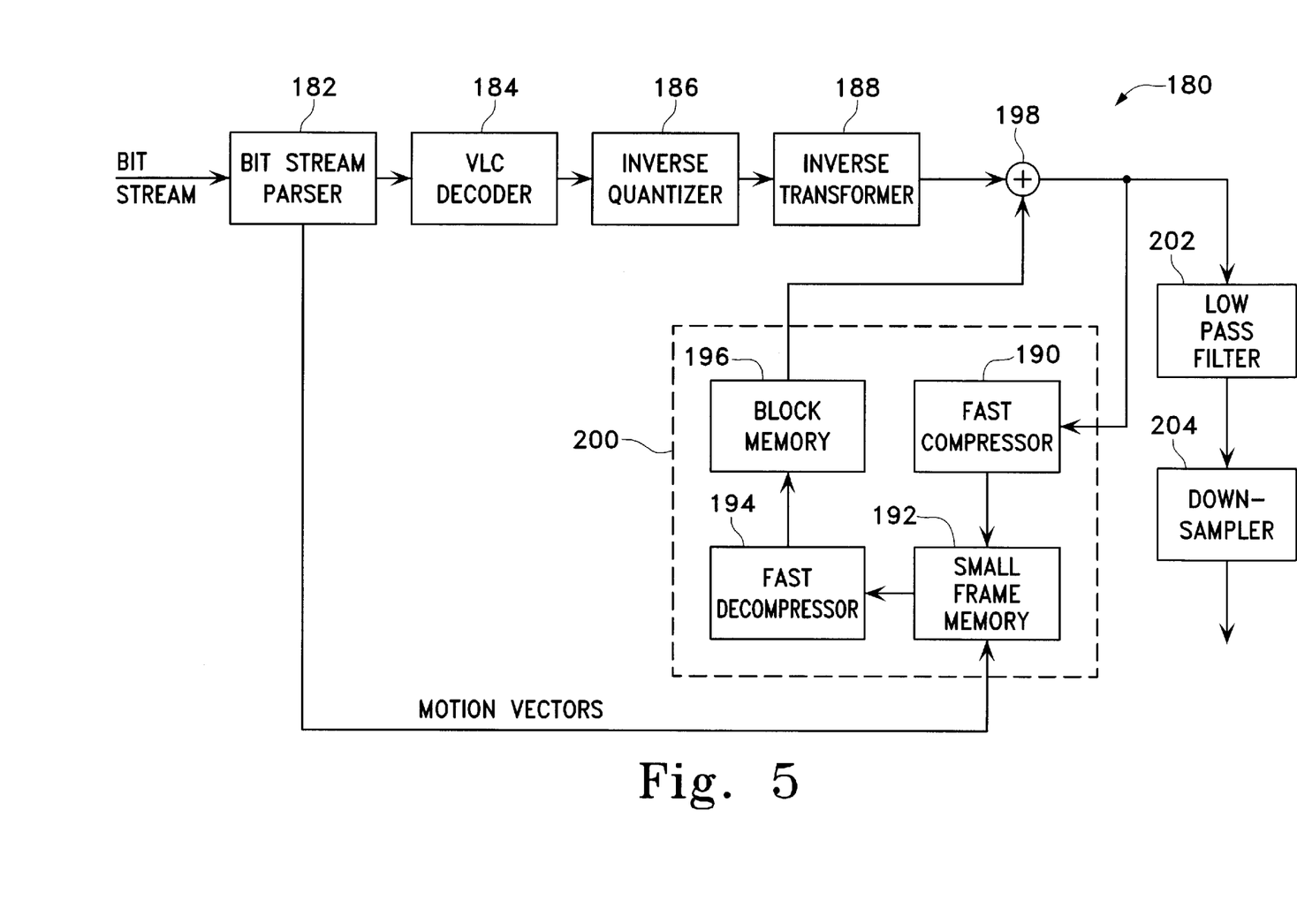
FIG. 5 is a diagrammatic representation of a decoding system of the present invention.

FIG. 5 illustrates a decoding system 180 according to the present invention. The decoding system 180 includes a reference image compressor 200. The reference image compressor 200 in the decoding system 180 functions similarly to the reference image compressor 100 in the encoding system 60. The bitstream parser 182, variable length coding (VLC) decoder 184 (or fixed length decoder, if appropriate), inverse quantizer 186 and inverse transformer 188 function as in conventional decoders. The present invention differs from prior art decoders in that it compresses the reference frames for storage in a relatively small frame memory 192. The frames are decompressed during block reconstruction.

To implement this improvement, the reference image compressor 200 includes a fast compressor 196, a small frame memory 192, a fast decompressor 194, and a block memory 196. These elements function similarly to their counterparts in the reference image compressor 100 in the encoding system 60: the fast compressor 76, the small frame memory 78, the fast decompressor 82, and the block memory 84. According to the present invention, the fast compressor 192 compresses reference images, such as the I or P frames. The compression is performed on a block-by-block basis. The compressed blocks are stored in spatial order in the small frame memory. In order to decode B pictures, the frame memory must store two successive reference images from which the B pictures are derived.

The decoding system 180 receives the first image frame 10 encoded in a bit stream format as that outputted by the encoding system 60. A bit stream parser 182 parses the bit stream and sends its output to a VLC decoder 184. The decoder 184 uses the format of the encoder 68 shown in FIG. 4. Next, an inverse quantizer 186 acts upon an output of the VLC decoder 184. The inverse quantizer 186 reverses the quantization of the quantizer 66 in the encoding system 60. An inverse transformer 188 acts upon the output of the inverse quantizer 186 to reverse the transformation performed by the transformer 64 in the encoding system 60. In some embodiments, the inverse transformation includes an upsampling. A decoded output of the inverse transformer 188 is output from the decoding system 180 as a reconstructed block. Additionally, the output of the inverse transformer 188 is processed by fast compressor 190 whose output is stored in the small frame memory 192.

The decoding system 180 receives motion vectors and error blocks encoded in a bit stream for the second image frame 12. When the bit stream parser 182 parses a motion vector, it is sent to the small frame memory 192 to select a motion compensation block. The motion compensation block is decompressed by a fast decompressor 194 and stored in a block memory 196. The block designated by the motion vector, the motion compensation block, usually does not align with the compressed blocks because rarely is the displacement from frame to frame in increments of exactly one block. Thus, the motion vector will actually retrieve the motion compensation block that can come from and overlap as many as four reference blocks in frame memory. The fast decompressor 194 decompresses the 1 to 4 blocks that include any pixels of the motion compensation block.

In one embodiment, the decompressor 194 then stores only the motion compensation block in block memory 196. However, it is likely that the next predicted block will fall within the same 4-block area. Thus, in another embodiment, the fast decompressor 194 may store all four blocks in block memory 196. The larger the area stored in block memory 196, the more efficient the compression algorithm becomes because fewer decompressions need to be performed in order to reconstruct predicted blocks. The system designer must trade off the speed of the algorithm with memory size.

The motion vector is applied to the small frame memory 192 to select the motion compensation block for the P frame after the small frame memory 192 has stored a number of reference blocks from the reference image 10. For this to occur, there must be some way to correlate the compressed data with individual uncompressed blocks. This requirement influences the data representation and compression techniques. The appropriate code word length and compression techniques were discussed above with reference to the encoding system 60 in FIG. 4. The fast compressor 190 and fast decompressor 194 use the same techniques as the fast compressor 76 and the fast decompressor 82.

When the bit stream parser 182 parses an error block corresponding to a block in the second frame image 12, a parsed error block is sent to the VLC decoder 184. The VLC decoder 184 decodes the error block just as the blocks in the first image frame 10 were decoded. Subsequently, the inverse quantizer 186 and inverse transformer 188 act upon the output of the decoder 184 for the error block. An adder 198 combines the output for the error block from the inverse transformer 188 with a selected motion compensation block stored in the block memory 196 to produce a reconstructed block for the second image frame 12. The reconstructed block is then outputted by the decoding system 180 and fed into the fast compressor 190. Once the reconstructed block is compressed by the fast compressor 190, it is stored in a small frame memory 192. The small frame memory stores the reconstructed block for use in predicting future blocks in future images.

Additional blocks for subsequent frames may also be decoded by the decoding system 180. In those cases, the bit stream parser 182 would parse motion vectors for the additional blocks in the subsequent frames. The motion vectors would select blocks in the small frame memory 192 which would then be decompressed by the fast decompressor 194. These motion compensation blocks for the blocks in the subsequent frames would then be stored in the block memory 196.

When the bit stream parser 182 parses the additional error blocks from the subsequent frames, these blocks are then processed by the decoder 184, the inverse quantizer 186, and the inverse transformer 188. The adder 198 combines the output of the inverse transformer 188 for the additional error blocks of the subsequent images with selected motion compensation blocks stored in the block memory 196. These motion compensation blocks stored in the block memory 196 were stored based upon motion vectors for the additional blocks in the additional images. The adder 198 outputs reconstructed blocks for the additional images which are then output by the decoding system 180. The reconstructed blocks are also stored in the small frame memory 192 after processing by the fast compressor 190. After a predicted P or B frame has been formed from one or two motion compensation blocks, respectively, a displaced error block is added 198 to the decoder error block to reconstruct the block in real time.

In one embodiment, the decoding system 180 can decode a bit stream generated by the conventional encoding system 20. In that case, there might theoretically be a prediction drift problem due to the motion prediction loop in the decoding system 180 not being perfectly matched to the motion prediction loop in the encoding system 20. In practice, however, there is little visual degradation. In another embodiment, the decoding system 180 can decode a bit stream generated by the encoding system 60. In that case, there is no prediction drift problem in theory or practice.

Optionally, in preferred embodiments, the decoding system 180 converts from high density images to standard density images to make high density images compatible with standard density image equipment. In this case, a lowpass filter 202 and a downsampler 204 may further process output of the inverse quantizer 186 or the adder 198.

By compressing reference images during motion estimation in the encoding system 60 or the decoding system 180, the present invention reduces error drift, thereby maintaining high picture quality while reducing memory requirements. When applied to high definition frames (1920×1024), the system can achieve target compression ratios from 2:1 to 8:1 with PSNRs ranging from approximately 50.56 to 32.72 dB, respectively.

While the invention has been described with reference to numerous specific details, one of ordinary skill in the art will recognize that the invention can be embodied in other specific forms without departing from the spirit of the invention. Thus one of ordinary skill in the art would understand that the invention is not to be limited by the foregoing illustrative details, but rather is to be defined by the appended claims.

What is claimed is:

1. A reference image compressor for use in an encoding system or in a decoding system, the reference image compressor comprising:

compression circuitry employing embedded coding for compressing reference frame information; and decompression circuitry for decompressing at least a portion of the reference frame information, wherein the portion is selected in response to a motion vector.

2. A reference image compressor for use in an encoding system or in a decoding system, the reference image compressor comprising:

compression circuitry employing wavelet coding for compressing reference frame information; and decompression circuitry for decompressing at least a portion of the reference frame information, wherein the portion is selected in response to a motion vector.

3. The reference image compressor of claim 2, wherein the compression circuitry employs embedded coding.

4. The reference image compressor of claim 3, wherein the reference frame information contains color information having luminance and chrominance components such that the compression circuitry weights the luminance and chrominance components to account for sensitivities of a human eye.

5. A reference image compressor for use in an encoding system or in a decoding system, the reference image compressor comprising:

compression circuitry for compressing reference frame information on a block-by-block basis;

decompression circuitry for decompressing at least a portion of the reference frame information, wherein the portion is selected in response to a motion vector; and block memory for storing a decompressed motion compensation block of the reference information, wherein the motion compensation block is specified by the motion vector.

6. The reference image compressor of claim 5, wherein the block memory also stores decompressed blocks of the reference information adjacent to the motion compensation block.

7. A method of interframe image decoding, said method comprising:

compressing reference frame information using embedded coding; and decompressing at least a portion of the reference frame information, said decompressing including receiving a motion vector and selecting the portion in response to said motion vector.

8. A method of interframe image decoding, said method comprising:

compressing reference frame information using wavelet coding; and decompressing at least a portion of the reference frame information, said decompressing including receiving a motion vector and selecting the portion in response to said motion vector.

9. The method of claim 8 wherein said compressing step includes the step of employing embedded coding.

10. A method of interframe image decoding, said method comprising:

compressing reference frame information block-by-block;

decompressing at least a portion of the reference frame information block-by-block, said decompressing including receiving a motion vector and selecting the portion in response to said motion vector;

selecting a motion compensation block of the reference frame information; and storing the motion compensation block in a block memory.

11. The method of claim 10 further comprising:

storing a decompressed block of the reference information adjacent to the motion compensation block in the block memory.

12. The reference image compressor of claim 1, wherein the reference frame information contains color information having luminance and chrominance components.

13. The reference image compressor of claim 2, wherein the wavelet encoding employs a Haar basis.

14. The reference image compressor of claim 3, wherein the wavelet encoding employs a Haar basis.

15. The reference image compressor of claim 14, wherein the reference frame information contains color information having luminance and chrominance components.

16. The reference image compressor of claim 15, wherein the compression circuitry weighs the luminance and chrominance components to account for sensitivities of the human eye.

17. The reference image compressor of claim 3, wherein the reference frame information contains color information having luminance and chrominance components.

18. The reference image compressor of claim 17, wherein the compression circuitry weighs the luminance and chrominance components to account for sensitivities of the human eye.

19. The method of interframe image decoding of claim 7 wherein the reference frame information contains color information having luminance and chrominance components.

20. The method of interframe image decoding of claim 8 wherein the wavelet encoding employs a Haar basis.

21. The method of interframe image decoding of claim 9 wherein the wavelet encoding employs a Haar basis.

22. The method of interframe image decoding of claim 21 wherein the reference frame information contains color information having luminance and chrominance components.

23. The method of interframe image decoding of claim 22 wherein the compressing step further includes weighing the luminance and chrominance components to account for sensitivities of the human eye.

24. The method of interframe image decoding of claim 9 wherein the reference frame information contains color information having luminance and chrominance components.

25. The method of interframe image decoding of claim 24 wherein the compressing step further includes weighing the luminance and chrominance components to account for sensitivities of the human eye.

* * * * *